United States Patent [19]

Van Selous

[11] Patent Number: 4,665,770
[45] Date of Patent: May 19, 1987

[54] CONTROL SYSTEM FOR A MULTIPLE RATIO TRANSMISSION HAVING A LOCKUP CLUTCH TORQUE CONVERTER

[75] Inventor: Joseph S. Van Selous, West Bloomfield, Mich.

[73] Assignee: Ford Motor Company, Dearborn, Mich.

[21] Appl. No.: 906,643

[22] Filed: Sep. 11, 1986

Related U.S. Application Data

[63] Continuation of Ser. No. 713,356, Mar. 18, 1985, abandoned.

[51] Int. Cl.$^4$ ............................................. F16H 47/00
[52] U.S. Cl. .................................... 74/733; 74/645;
192/3.31; 192/0.034
[58] Field of Search ............... 74/645, 732, 733;
192/3.31, 103 R, 0.033, 0.034

[56] References Cited

U.S. PATENT DOCUMENTS

| 3,446,095 | 5/1969 | Bookout | 74/763 |
| 3,491,621 | 1/1970 | Moan | 74/759 |
| 4,368,649 | 1/1983 | Vahratian et al. | 74/695 |
| 4,457,411 | 7/1984 | Hiramatsu | 192/3.31 X |
| 4,509,389 | 4/1985 | Vahratian et al. | 74/695 |
| 4,535,652 | 8/1985 | Nishikawa et al. | 74/733 |

FOREIGN PATENT DOCUMENTS

| 0067594 | 12/1982 | European Pat. Off. | 74/645 |
| 3103838 | 8/1982 | Fed. Rep. of Germany | 74/645 |
| 3402872 | 8/1984 | Fed. Rep. of Germany | 74/645 |

Primary Examiner—Allan D. Herrmann
Assistant Examiner—Dirk Wright
Attorney, Agent, or Firm—Donald J. Harrington; Keith L. Zerschling

[57] ABSTRACT

A control valve system for an automatic transmission having a hydrokinetic torque converter, a lockup clutch in the torque converter for mechanically bypassing the hydrokinetic torque flow path, speed and torque responsive valves for effecting ratio changes in the transmission, a bypass clutch control valve for engaging and disengaging the lockup clutch and a converter bypass valve for triggering operation of the bypass clutch control valve, the bypass clutch control valve being responsive to input torque and speed.

9 Claims, 11 Drawing Figures

| Gear | $Cl_1$ | $Cl_2$ | $Cl_3$ | $Cl_4$ | $B_1$ | $B_2$ | Drive | | Coast | | Ratio |
|---|---|---|---|---|---|---|---|---|---|---|---|
| | | | | | | | $OWC_1$ | $OWC_2$ | $OWC_1$ | $OWC_2$ | |
| 1M | X | | X | | | X | X | | | X | 2.779 |
| 1D | X | | | | | X | X | | O/R | | 2.779 |
| 2 | X | X | | | | X | O/R | | O/R | | 1.512 |
| 3 | X | X | X | | | | | X | X | | 1.000 |
| 4 | | X | X | X | | | | O/R | | O/R | .712 |
| R | X | | X | X | | | X | | | X | 2.474 |

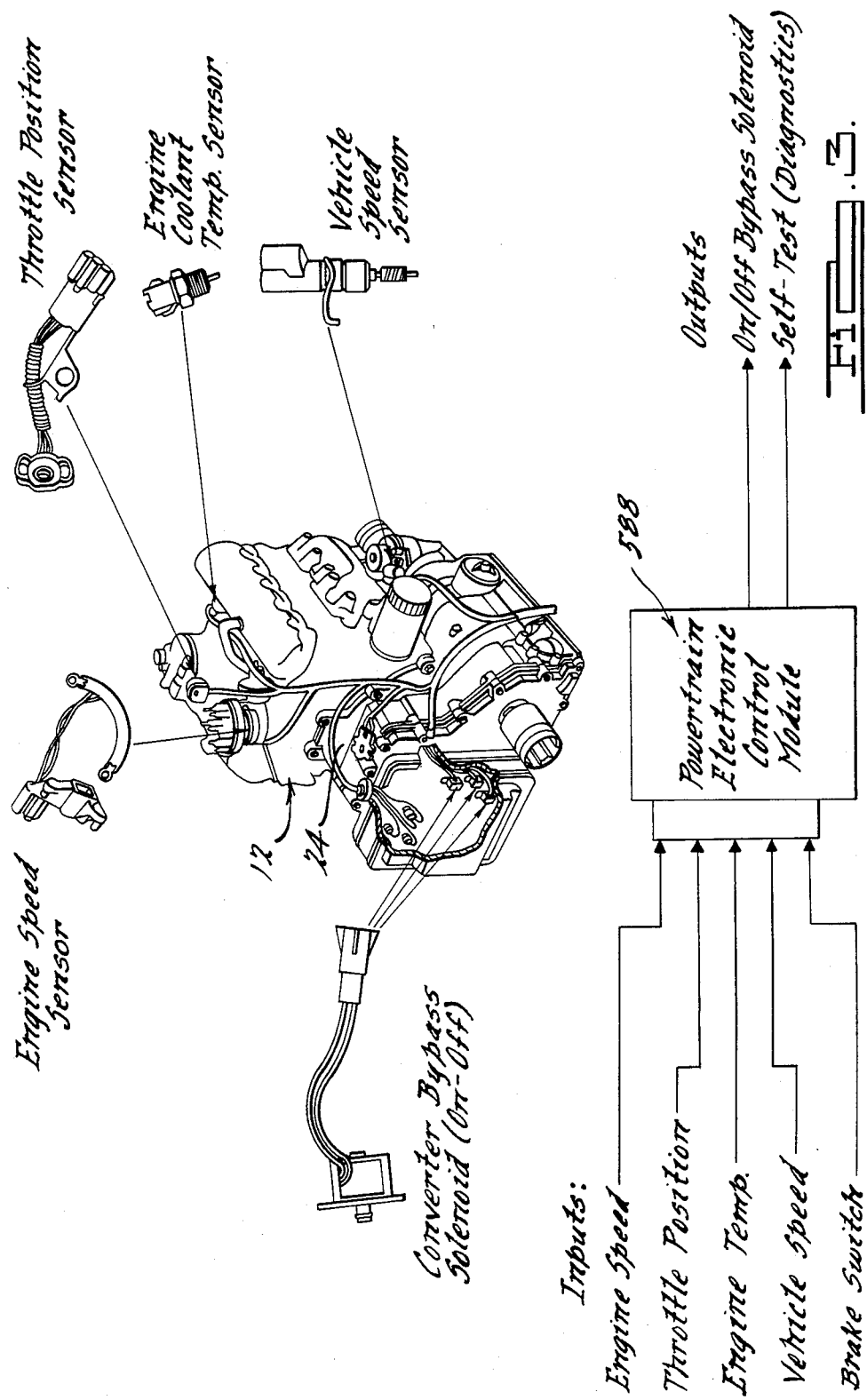

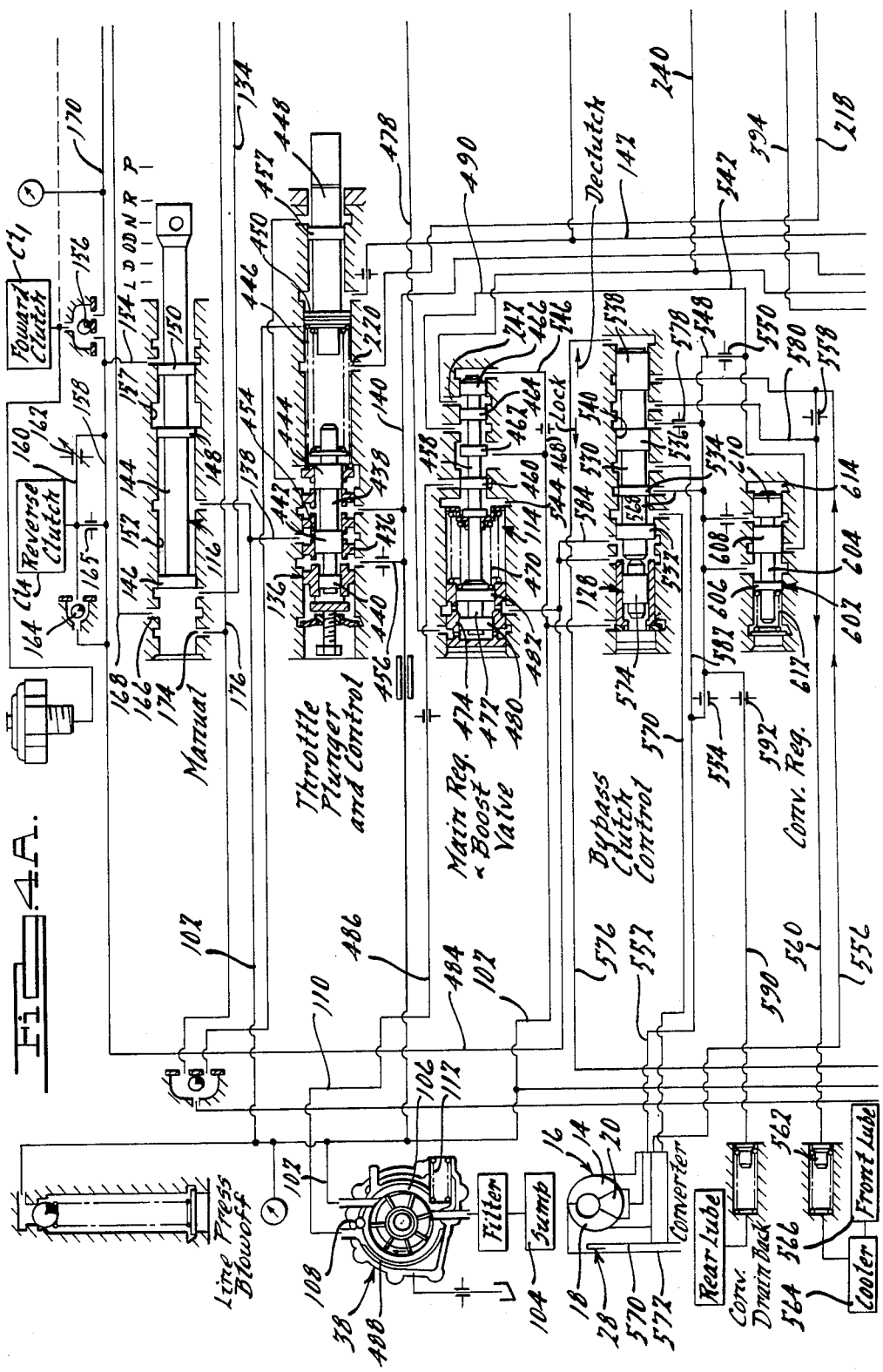

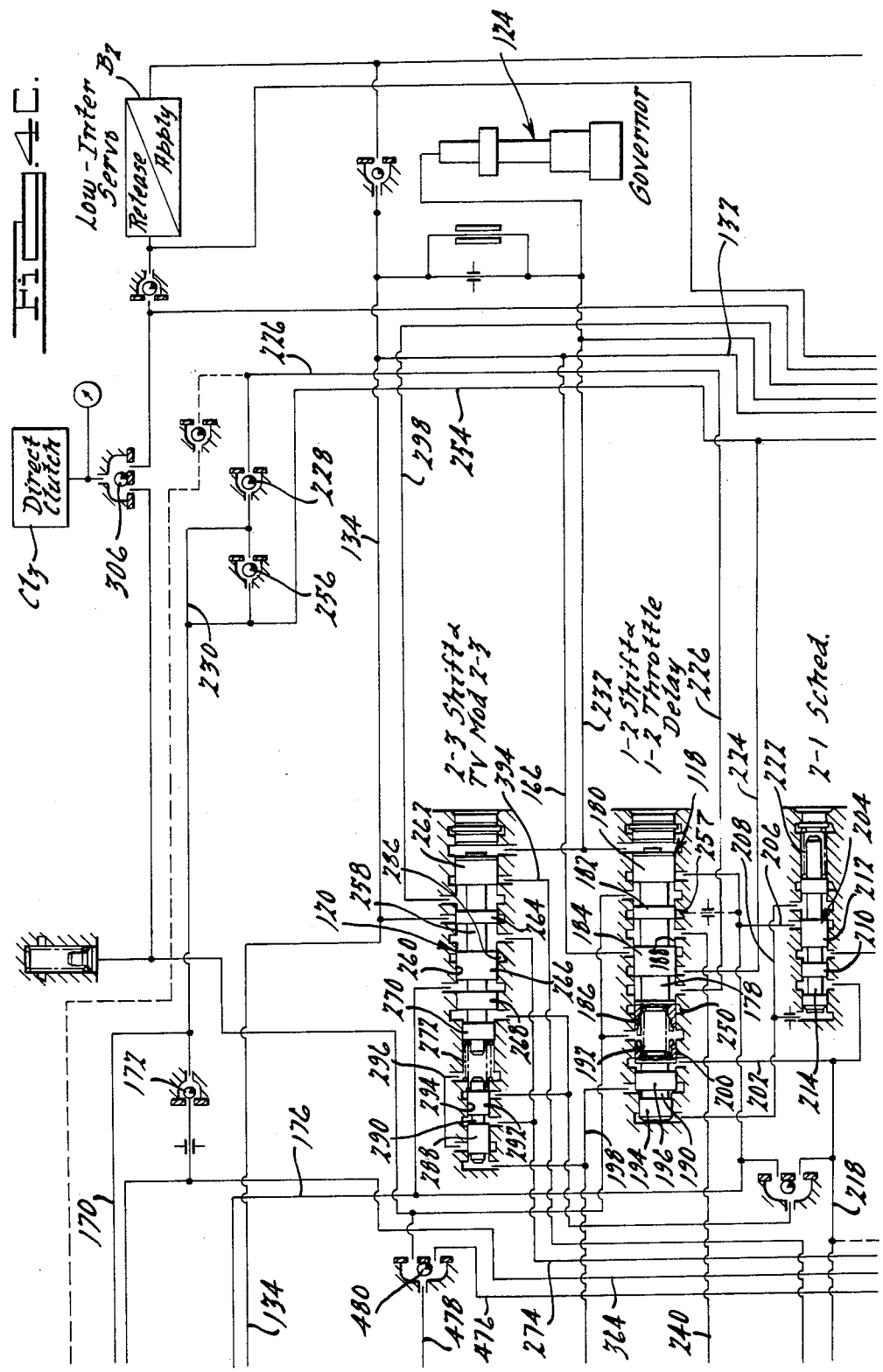

CONTROL SYSTEM FOR A MULTIPLE RATIO TRANSMISSION HAVING A LOCKUP CLUTCH TORQUE CONVERTER

This application is a continuation of application Ser. No. 713,356, filed Mar. 18, 1985, now abandoned.

GENERAL DESCRIPTION OF THE INVENTION

My invention comprises improvements in a transmission of the kind disclosed in U.S. Pat. Nos. 4,368,649; 3,491,621 and 3,446,095. It comprises improvements also in the transmission structure shown in pending application 447,065 now U.S. Pat. No. 4,509,389, filed by Vahratian et al, on Dec. 6, 1982. That application and the three U.S. patents are assigned to the assignee of this invention.

The improvements of my invention comprise control valve circuitry for controlling the application and release of clutches and brakes to establish four forward driving ratios and a single reverse ratio in a gear system such as that shown in application Ser. No. 447,065. That structure includes an automatic transaxle for a front wheel drive vehicle comprising a hydrokinetic torque converter located on the axis of an internal combustion engine for a vehicle and multiple ratio planetary gearing located on an offset parallel axis extending transversely with respect to the geometric center line of the vehicle.

The hydrokinetic torque converter includes a turbine shaft that is connected to the torque input shaft for the multiple ratio gearing by means of a drive chain. The planetary gearing comprises two simple planetary gear units and a final reduction gear unit, the latter being connected drivably to the carrier of a differential gear mechanism. The side gears of the differential gear mechanism are connected to the drive shafts for the vehicle traction wheels. Friction clutches and brakes are applied and released upon application and release of fluid pressure operated servos that form a part of the control system that is the subject of our present invention. In this way four forward driving ratios can be achieved, the highest ratio being an overdrive.

The torque converter assembly includes a fluid pressure lockup clutch which may be applied and released to establish and disestablish a mechanical bypass torque delivery path that is in parallel disposition with respect to the hydrokinetic torque delivery path established by the converter. Thus during acceleration of the vehicle when hydrokinetic torque multiplication of the converter is desired, the lockup clutch is released and the converter acts as a free converter in the usual fashion. During cruising when the hydrokinetic torque multiplication is not required, the lockup clutch is engaged thereby establishing a direct mechanical connection through the lockup clutch between the impeller and the turbine of the converter.

The lockup clutch can be engaged by means of a clutch control valve in the control valve circuit which is under the control of a converter bypass solenoid. The solenoid in turn responds to the output of an electronic control module that receives signals from the engine, such as signals representing engine intake manifold pressure, engine speed and engine temperature as well as a vehicle brake signal. The control module can be programmed to provide the maximum fuel economy operation for the converter engine with which the transmission is used or it may be programmed to provide a desired balance between maximum fuel economy operation and the so-called high performance operation where maximum wheel torque is available for acceleration purposes. The electronic control module may be programmed with information dealing with the relationship between engine speed and engine torque as well as the hydrokinetic torque converter size factor and other converter characteristics so that the lockup clutch can be engaged at the optimum instant depending upon the driveline performance that is desired by the operator. These additional calibrations, however, are not part of this disclosure. Such additional calibrations would require additional input signals from the circuit to indicate the operating ratio of the gearing and the converter ratio at any instant. For purposes of this disclosure, the variable input signals are throttle position engine temperature and vehicle speed. The electronic control module produces a variable output that is received by the bypass clutch control to establish optimum engagement pressure for the lockup clutch so that the lockup clutching capacity is consistent with the actual torque delivery requirements at any instant.

BRIEF DESCRIPTION OF THE FIGURES OF THE DRAWINGS

FIG. 3 is a schematic representation showing the power train electronic control module that is used to control the converter bypass solenoid.

FIG. 4A, FIG. 4B, FIG. 4C and FIG. 4D collectively show the hydraulic control valve circuitry for controlling the transmission structure of FIG. 1, each view showing a separate section of the circuitry.

PARTICULAR DESCRIPTION OF THE INVENTION

Figures 1, 2:
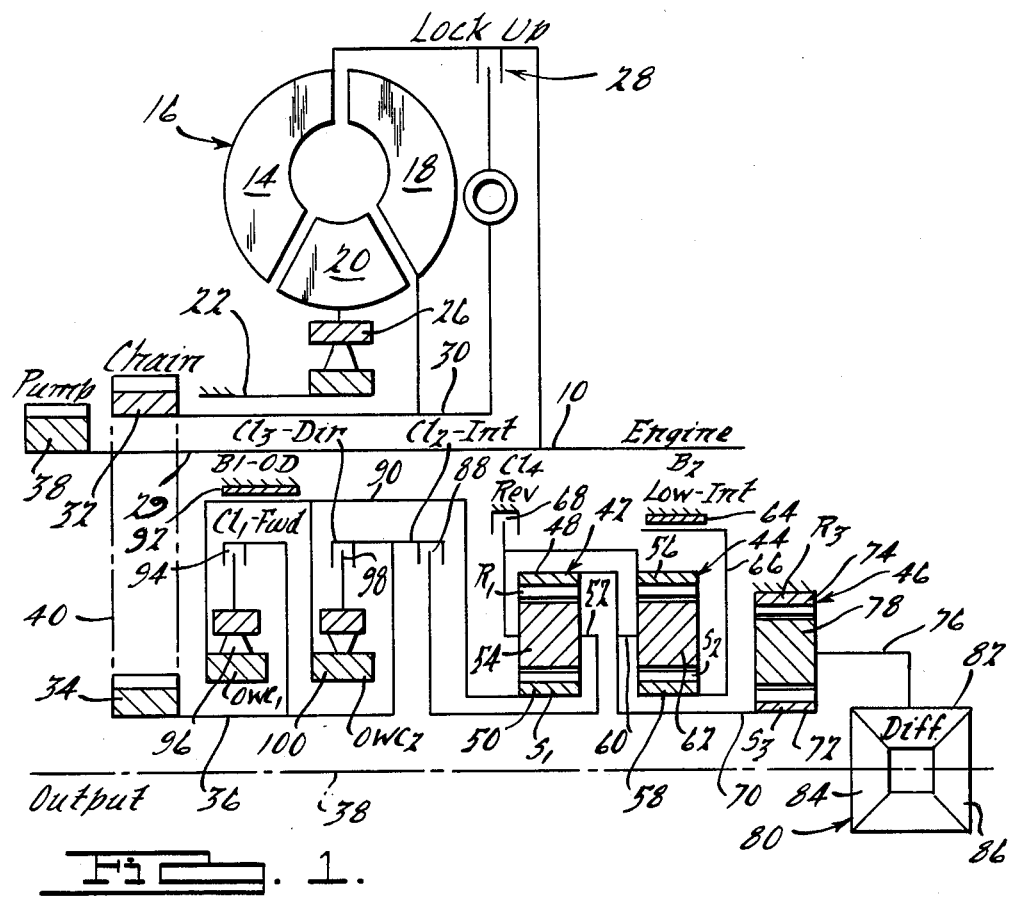
FIG. 1 shows a schematic view of the hydrokinetic torque converter and gearing arrangement for the transmission system that is capable of embodying the improved valve circuitry of my invention.
FIG. 2 is a chart that shows the clutch and brake engagement and pattern for the clutches and brakes shown in FIG. 1.

In FIG. 1 numeral 10 designates the crankshaft of an internal combustion engine shown schematically in FIG. 3 at 12. Crankshaft 10 is connected to the impeller 14 of a hydrokinetic torque converter 16. The converter 16 includes also a bladed turbine 18 and a bladed stator 20, the latter being located between the torus flow outlet section of the turbine 18 and the torus flow inlet section of the impeller 14. The stator 20 is supported by a stationary sleeve shaft 22 connected to the transmission housing shown at 24 in FIG. 3. An overrunning brake 26 is situated between the bladed section of the stator 20 and the stationary sleeve shaft 22. Overrunning brake 26 permits freewheeling motion of the stator 20 in the direction of rotation of the impeller but it prevents rotation in the opposite direction.

A torque converter lockup clutch 28 is adapted to establish a driving connection between the impeller 14 and turbine shaft 30, the latter being connected to the bladed impeller 18. For a complete description of the mode of operation of the clutch 28, reference may be made to the previously identified patent application Ser. No. 447,065.

The engine crankshaft 10 is connected to a pump driveshaft 29 which powers a variable displacement pump 38 for the automatic transmission control system to be described with reference to FIGS. 4A through 4D. Turbine shaft 30, which is a sleeve shaft surrounding driveshaft 29, serves as a torque input shaft for a drive sprocket 32. A driven sprocket 34 is connected to torque input shaft 36 for multiple ratio gearing disposed about the output shaft axis 38. Axis 38 is parallel and laterally offset with respect to the engine crankshaft. Drive chain 40 serves as a torque transfer member that connects drivably the drive sprocket 32 with the driven sprocket 34.

The multiple ratio gearing comprises a pair of simple planetary gear units 42 and 44 as well as a final drive planetary gear unit 46. Gear unit 42 includes ring gear 48, sun gear 50, a planetary carrier 52 and multiple planet pinions 54 which are journalled on carrier 52 so that they mesh with ring gear 48 and sun gear 50.

Carrier 52 is connected directly to ring gear 56 of the planetary gear unit 44. Gear unit 44 includes also sun gear 58, planetary carrier 60 and planet pinions 62 journalled on carrier 60 so that they mesh with ring gear 56 and sun gear 58.

Sun gear 58 is adapted to be braked by a low and intermediate brake band 64 which surrounds brake drum 66 connected to the sun gear 58. The low and intermediate brake 64 carries the notation $B_2$ in FIG. 1 as well as in the chart of FIG. 2.

A reverse brake 68 selectively brakes the ring geare 56 and the carrier 52 which are connected together as explained. Brake 68 in FIG. 2 carries the notation $CL_4$ in FIG. 1 as well as in the chart of FIG. 2.

Carrier 60 is connected to torque output shaft 70 for the planetary gearing. Shaft 70 is connected to sun gear 72 of the final drive planetary gear unit 46. Gear unit 46 includes also ring gear 74 which is held stationary by the transmission housing. Gear unit 46 includes also carrier 76 which journals pinions 78 that mesh with ring gear 74 and sun gear 72. Carrier 76 is connected to the differential carrier of a differential gear unit 80. The differential carrier has pinions 82 journalled thereon, and these are connected drivably to the carriers 76.

Differential gear unit 80 includes also side gears 84 and 86. Each side gear is connected to a separate torque output half-driveshaft, the outboard ends of the driveshafts being connected to the vehicle traction wheels. A universal joint, not shown, connects one end of each half shaft with its associated side gear and the outboard end of that half shaft is connected to its associated traction wheel by a second universal joint, not shown.

The input sleeve shaft 36 is connected to the carrier 52 of gear unit 42 through an intermediate speed ratio clutch 88. That clutch is identified by the symbol $CL_2$ in FIG. 1 as well as in the chart of FIG. 2. Sun gear 50 of the gear unit 42 is connected to brake drum 90 about which is positioned overdrive brake band 92. Brake band 92 is identified by the symbol $B_1$ in FIG. 1 as well as in the chart of FIG. 2. Sun gear 50 and brake drum 90 to which it is connected is connected to input shaft 36 through forward clutch 94 and overrunning clutch 96 situated in series relationship. Clutch 94 is identified by the symbol $CL_1$ in FIG. 1 as well as in the chart of FIG. 2. The overrunning clutch 96 is identified by the symbol $OWC_1$ in FIG. 1 as well as in the chart of FIG. 2.

A direct drive clutch 98 and a second overrunning clutch 100, which are arranged in series relationship, connect input shaft 36 with the brake drum 90 and the sun gear 50. The symbol $CL_3$ identifies the direct drive clutch in FIG. 1 as well as in the chart of FIG. 2. A second overrunning clutch is identified by the symbol $OWC_2$ in FIG. 1 as well as in the chart of FIG. 2.

By engaging selectively the clutches and the brakes, four forward driving speed ratios can be achieved as well as a single reverse speed ratio. The forward clutch 94 is engaged during operation in the first three forward driving ratios and the intermediate clutch 88 is engaged the second, third and fourth forward driving ratios. Direct drive clutch 98 is engaged during operation in the third and fourth forward driving ratios as well as the reverse driving ratio. It is engaged also during manual low operation to effect a bypass around the overrunning clutch 100 during engine braking.

Sun gear 50 acts as a reaction member during overdrive operation. It is braked by overdrive brake band 92 which is applied during fourth ratio operation. Low and intermediate brake band 64 is applied during operation in low and intermediate operation.

In the chart of FIG. 2 the clutch engagement and release pattern is indicated. A symbol "X" is used to define an engaged clutch or brake. The symbol O/R is used to indicate an overrunning condition for the appropriate overrunning clutch.

In the control system shown in FIGS. 4A through 4D the valves and the clutch and brake servos are supplied with fluid pressure developed by a positive displacement pump 38 having a variable displacement characteristic. Pump 38 communicates at its outlet side with a high pressure supply passage 102 and it communicates at its low pressure inlet side with a transmission sump 104. The pump 38 includes a stator ring 106 which is pivoted at 108 to provide a variable displacement control. The angle to which the stator 106 ring is adjusted with respect to the pivot 108 is dependent upon the pressure supplied to one side of the stator ring through a pump control passage 110. The force created by the pressure in passage 110 is opposed by compression spring 112. For a further understanding of the mode of operation of variable displacement pumps of this kind, reference may be made to U.S. Pat. No. 3,656,869 issued to Alan S. Leonard and to U.S. Pat. No. 4,342,545 issued to David A. Schuster.

High pressure line pressure passage 102 supplies line pressure to a main regulator and boost valve assembly 114 which regulates the pressure to a calibrated value as will be explained subsequently. The output pressure of the main regulator and boost valve 114 is supplied through passage 102 to a manual valve assembly 116, which is under the control of the vehicle operator and which permits the operator to select any one of several operating modes. These operating modes are identified in FIG. 4A by the symbols L, D, OD, N and R which designate, respectively, the manual valve positions for low or manual drive mode, the three speed automatic drive range mode, the four speed overdrive range mode, neutral condition and reverse drive.

The manual valve 116, as explained subsequently, delivers working pressure to the three shift valves that control the ratio changes. These are the 1-2 shift and 1-2 throttle delay valve assembly 118 shown in FIG. 4C, the 2-3 shift and TV modulator valve assembly 120 for 2-3 shifts and 3-2 shifts shown in FIG. 4C, the 3-4 shift and modulator valve assembly 122 for 3-4 shifts and 4-3 shifts and the vehicle speed governor assembly 124 shown in FIG. 4C. High pressure is supplied by passage 102 also to an accumulator regulator valve assembly 126. Valve assembly 126 provides a cushioned engagement of the overdrive brake $B_1$ on a 3-4 upshift. It provides a relatively steep linear relationship of pressure in the overdrive brake with respect to time and a corresponding relationship for the rate of pressure build up in the intermediate clutch $CL_2$. Valve assembly 126 controls also the engagement of the intermediate clutch $CL_2$ on a 1-2 upshift.

The bypass clutch control valve assembly 128 is supplied with control pressure from a passage 102 as seen in FIG. 4A. The bypass clutch control regulates the engagement and release of the lockup clutch 28 seen schematically in FIG. 1. The function of the bypass clutch control will be described particularly later in this specification.

For a particular description of a governor capable of functioning with the characteristic of governor 124, reference may be made to U.S. Pat. No. 4,323,093 issued to Douglas A. Whitney and U.S. Pat. No. 3,559,667 issued to Erkki A. Kolvunen.

Figure 4B:
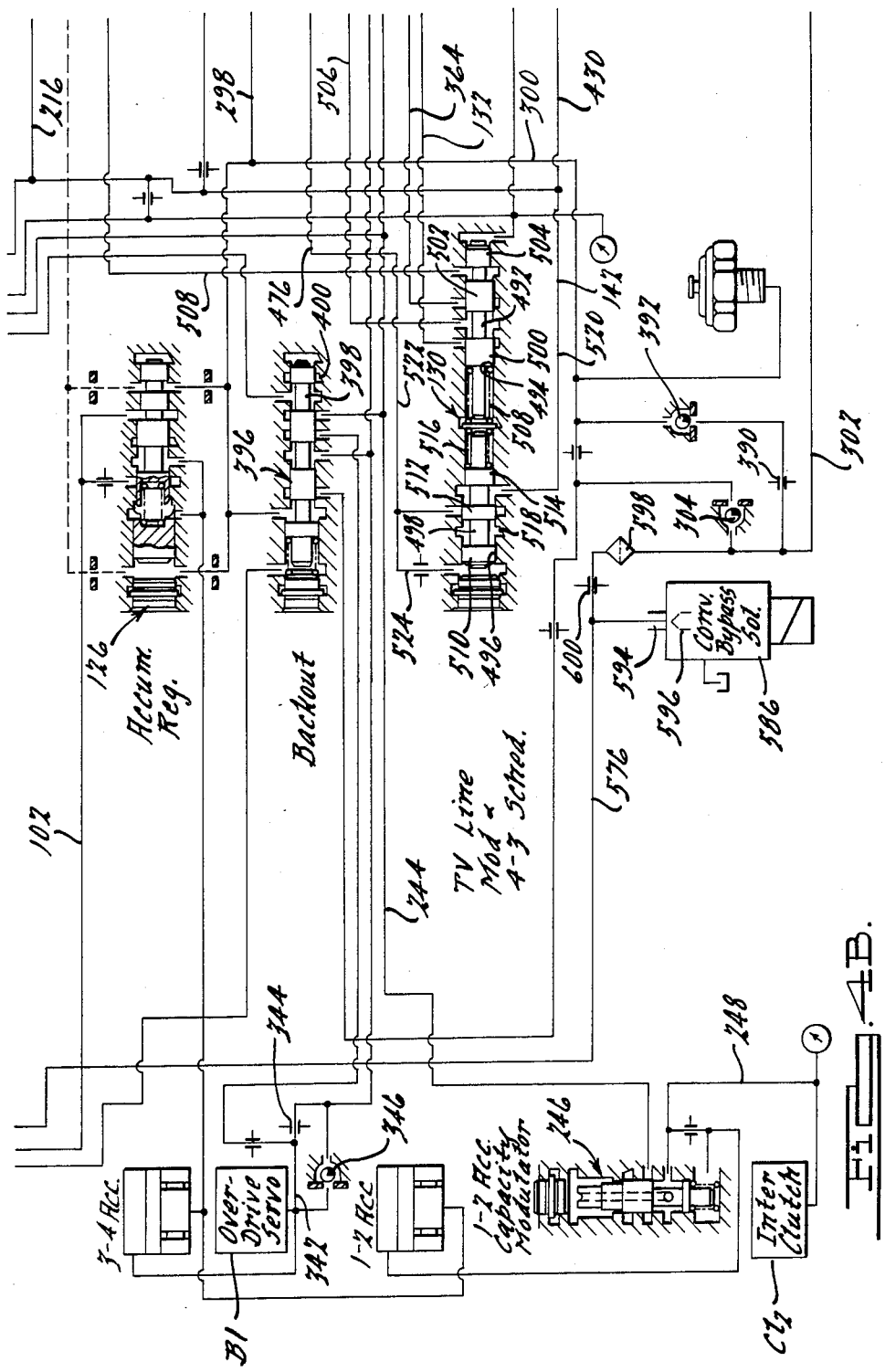

In FIG. 4B there is shown a TV modulator and 4-3 scheduling valve assembly 130. Line pressure is distributed to the valve assembly 128 through line pressure passage 132 which communicates with passage 134 shown in FIGS. 4A and 4C. Passage 134 in turn is supplied with line pressure by the manual valve assembly 116 when the manual valve assembly is in a condition for overdrive operation corresponding to position OD, when it is positioned for automatic drive range position corresponding to manual valve position D and when it is conditioned for manual-low operation corresponding to manual valve position L.

A throttle plunger and control valve assembly 136, shown in FIG. 4A, is supplied with fluid from line pressure passage 102 through passage 138. Output pressure from the throttle plunger and control valve assembly 136 delivers a throttle valve pressure signal to passage 140, which extends to the previously described TV line modulator and 4-3 scheduling valve assembly 130. The output of valve assembly 130 is distributed to passage 142 which extends to the 1-2 shift and 1-2 throttle delay valve assembly 118 for delaying 1-2 upshifts, to the 2-3 shift and throttle valve pressure modulator valve assembly 120 for delaying 2-3 upshifts and to the 3-4 shift and TV modulator valve assembly 122 for delaying 3-4 upshifts.

Each valve assembly discussed in the foregoing description now will be described with more detail.

Manual Valve Assembly

Valve assembly 116 comprises a multiple land valve spool 144 having spaced valve lands 146, 148 and 150. Valve spool 144 is positioned in a valve chamber 152 which is provided with internal valve lands that register with the external valve lands of the valve spool. Valve plunger 144 can be positioned axially with respect to the internal valve lands in any one of the positions indicated by the symbols L, D, OD and R. In FIG. 4A valve spool 144 is shown in the neutral position N.

When the manual valve spool 144 is positioned as shown, distribution of pressure from the supply passage 102 to the various valve ports is blocked by lands 146 and 148. When the valve spool 144 is positioned in the reverse position R, communication is established between supply passage 102 and reverse line pressure passage 154 as fluid pressure is distributed across land 148, which registers with axially elongated valve groove 157. The pressure in passage 154 causes double position check valve 156 to shift to its right hand position establishing communication between passage 154 and forward clutch $CL_1$. Pressure is transferred also from passage 154 to the reverse clutch $CL_4$ through passage 158 and passage 160. Passage 158 and 160 are parallel. Passage 160 is provided with an orifice 162 which is thermostatically controlled so that it is less restrictive when the transmission fluid is cold and more restrictive when it is hot. A parallel orifice 164 in passage 158 is a fixed size orifice. Thus the engagement time for the reverse clutch $CL_4$ is not unduly prolonged because of low temperature of the oil. When the clutch $CL_4$ is applied, one-way check valve 164 closes thereby preventing rapid filling of the servo for the reverse clutch. When the clutch is released, however, passage 158 communicates with the reverse clutch through the one-way check valve 164, thereby permitting rapid exhaust of the clutch $CL_4$ through passage 158 and through the right hand end of the manual valve chamber 152, which is open to the transmission sump.

If the manual valve spool 144 is shifted to the position OD, passage 102 communicates with passage 134 through the portion of the valve chamber 152 intermediate lands 146 and 148. Passage 134, as mentioned previously, communicates with passage 132, which in turn communicates with passage 166 leading to the 1-2 shift and 1-2 throttle delay valve assembly 118.

When the manual valve is moved to the D position, passage 134 continues to be pressurized through the same pressure delivery route. Passage 154 continues to be exhausted through the right hand end of the valve chamer 152. Land 146 moves to the left hand side of port 166 thereby establishing communication between passage 102 and passage 168. Since passage 154 is exhausted, the double position check valve 156 shifts to its left hand position and the forward clutch $CL_1$ communicates with passage 170. Passage 168 communicates with passage 170 to pressurize the clutch $CL_1$. That communication is established by one-way check valve 172. Thus the front clutch can be engaged with valve assembly 116 in the D position during operation in the low ratio, the second ratio and the third ratio.

When the manual valve is shifted to the L position, land 146 on the manual valve spool 144 moves to the left hand side of the port 174 so that passage 176 becomes pressurized. Both passages 166 and 176 communicate with the supply passage 102 through the space in the valve chamber 152 between the lands 146 and 148. Passage 134 also continues to be pressurized since it too communicates with that same valve space.

1-2 Shift and 1-2 Throttle Delay Valve

FIG. 4C shows the 1-2 shift and 1-2 throttle delay valve 118 which is in communication with passage 166. That passage is supplied with control pressure from the pump 38. Valve assembly 118 comprises a valve spool 178 having spaced valve lands 180, 182, 184 and 186. Valve spool 178 is situated in a valve chamber 188 that is occupied also by the throttle delay valve spool 190. Valve spring 192 separates the spools 190 and 178, the valve spools being aligned, one with respect to the other.

Valve spool 190 has valve lands 194 and 196 of differential area. The differential area defined by these lands is subjected to throttle valve limited pressure in passage 198 which communicates with the previously described throttle valve limited pressure passage 142. Throttle valve spool 190 has a third valve land 200 which is larger in diameter than land 196. It defines with land 196 a differential area that communicates with passage 202, which is subjected to a kickdown pressure passage from the 2-1 scheduling valve assembly 204.

Line pressure from passage 176 is fed to the valve assembly 204 through passage 206. That pressure is regulated by the 2-1 scheduling valve to produce a 2-1 downshift scheduled pressure in passage 208 which is distributed to the left hand side of the 1-2 delay valve spool land 194. The pressure in passage 202 or in passage 208 has the effect of increasing the effective force of spring 192 thereby increasing the 1-2 shift delay during acceleration from a standing start.

Throttle valve limiting pressure is distributed to the differential area of 2-1 scheduling valve lands 210 and 212 formed on 2-1 scheduling valve spool 214. That throttle valve limiting pressure is distributed to the 2-1 scheduling valve through passage 216 which communicates with passage 142. The kickdown pressure that is distributed to passage 202 is received from kickdown pressure passage 218 which extends to kickdown pressure port 220 of the throttle plunger and control valve assembly 136. The force of the kickdown pressure and the throttle valve limiting pressure on the 2-1 scheduling valve is opposed by valve spring 222 so that the effective pressure in scheduling pressure passage 208 is a function of throttle position so that the 2-1 shift point can be controlled.

The right hand end of land 180 of the 1-2 shift and 1-2 throttle delay valve assembly 118 is subjected to governor pressure distributed to the assembly 118 through governor passage 232. The magnitude of the pressure in passage 224 depends on vehicle speed.

Figure 4D:
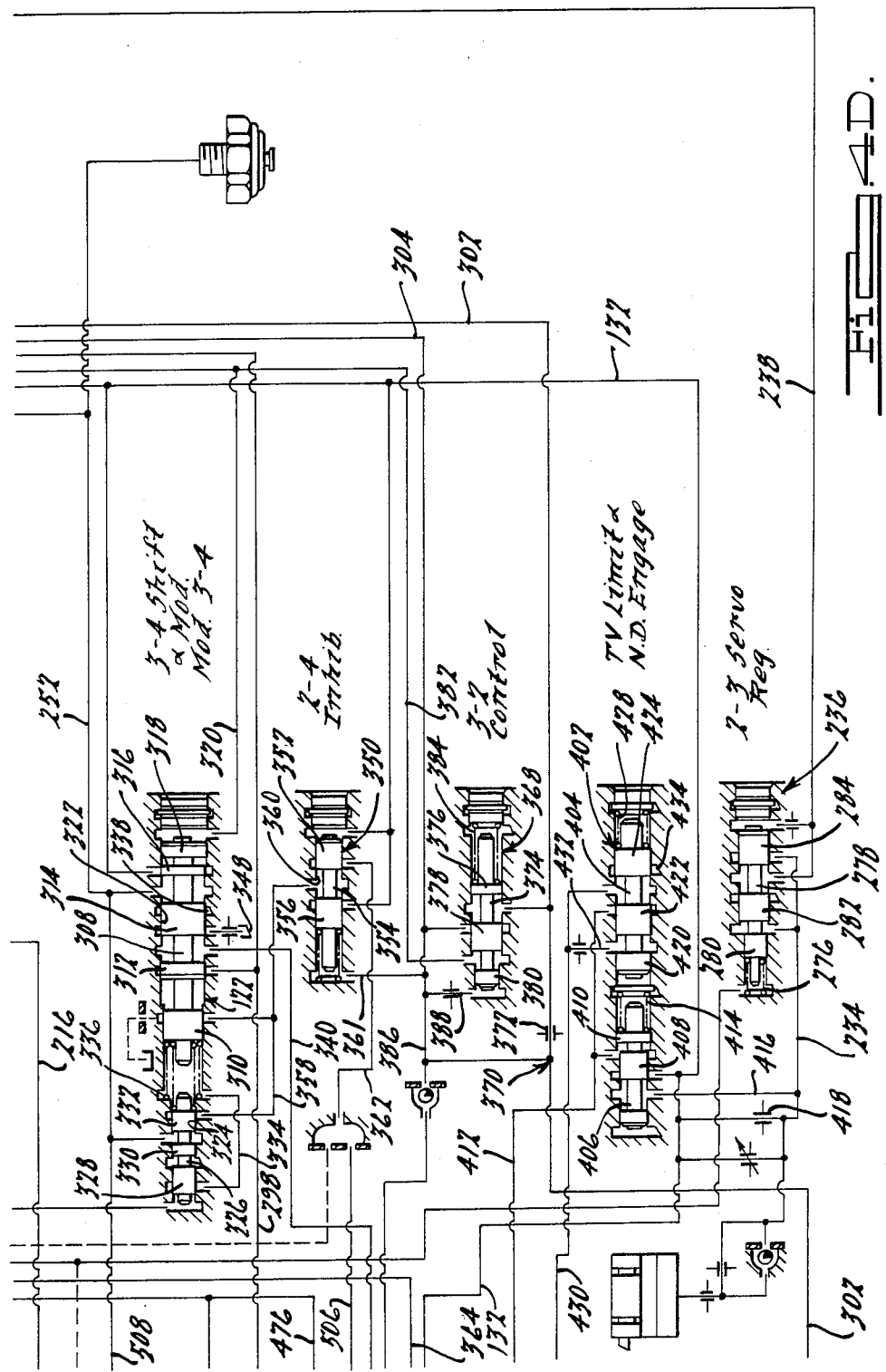

When the valve spool 178 is in its right hand position, line pressure from passage 166 is blocked by the land 184. The valve spool establishes communication, however, between passages 224 and 226 as the port communicating with passage 224 becomes uncovered by land 184. Passage 226 under these conditions communicates through the one way check valve 228 with passage 230, which in turn communicates with passage 170. Since passage 224 thus becomes pressurized, control pressure is distributed to the forward clutch speed passage 230 through the check valve 228 and through the double position check valve 156 located in passage 170. Line pressure, which is present in passage 134, is distributed to passage 132 and to passage 234 as seen in FIG. 4D. Communication is established by the 2-3 servo regulator valve assembly 236 with low-and-intermediate servo apply passage 238 which extends the low-and-intermediate servo $B_2$ as seen in FIG. 4C. Thus when the 1-2 shift and 1-2 throttle delay assembly 118 is in a right hand position, both forward clutch $CL_1$ and low-and-intermediate servo $B_2$ are applied. As indicated in FIG. 2, this effects a low speed drive mode.

When the governor pressure in passage 232 increases, the force acting on the right hand end of the valve spool 178 overcomes the force of spring 192 and the force of the throttle valve limiting pressure acting on the valve spool 190, thereby causing the valve assembly 118 to upshift to the second drive mode position as spool 178 shifts in a left hand direction. At that time line pressure passage 166 communicates with intermediate clutch feed passage 240. The line pressure signal then is delivered to port 242 of the main regulator and boost valve assembly 114, as seen in FIG. 4A, to effect a cutback in the magnitude of the line pressure maintained by the main regulator and boost valve assembly. The pressure in passage 240 is distributed also to intermediate clutch feed passage 244, which communicates with feed passage 248 for the 1-2 accumulator capacity modulator valve assembly 246 seen in FIG. 4B. The intermediate clutch $CL_2$ thus becomes applied as clutch $CL_1$ continues to be applied notwithstanding the communication established between feed passage 226 and exhaust port 250 of the 1-2 shift and 1-2 throttle delay valve assembly 118.

Passage 224 is pressurized by reason of the communication between line pressure passage 132 and passage 252 through the 3-4 shift and modulator valve assembly 122. Passage 252 communicates with passage 224 and with passage 254 which extends to the forward clutch feed passage 230. Check valve 228 closes since passage 226 is exhausted as does one way check valve 256.

Passage 240, which becomes pressurized on a 1-2 upshift as explained previously, communicates with exhaust port 257 and the valve assembly 118 when the valve 178 is in a right hand position.

2-3 Shift and TV Modulator Valve Assembly

Valve assembly 120 comprises a multiple land valve spool 258. It is slidably positioned in a valve chamber 260, which has internal valve lands that register with five valve spool lands identified by reference numerals 262, 264, 266, 268 and 270. Governor pressure from passage 232 is distributed to the right hand side of valve land 262. When the valve assembly in the downshift position, the force of valve spring 272 and the other hydraulic forces acting on the valve spool 258 overcome the force of the governor pressure in passage 232 and valve spool 258 assumes a right hand position, which corresponds to the intermediate speed ratio. At this time communication is established between line pressure passage 134 and passage 274, which communicates with the left hand side of the 2-3 servo regulator valve shown at 236 in FIG. 4D. This force supplements the force of valve spring 276 acting on valve spool 278 of the valve assembly 236.

The 2-3 servo regulator valve assembly comprises a small valve land 280 and larger diameter valve lands 282 and 284. Passage 274, which is pressurized when the manual valve is in the low range position or when the shift valves are in the first or second speed ratio positions, distributes pressure to the left hand side of the land 280 to augment the force of the spring 276 thus assuring that the valve spool 278 is in a right hand position. This establishes direct communication between passage 234 and the low-and-intermediate speed ratio apply servo feed passage 238. The 2-3 shift valve spool 258 is shifted in a left hand direction. Upon a 2-3 upshift, however, passage 274 becomes exhausted through exhaust port 286 in the valve assembly 120. This permits the 2-3 servo regulator valve to modulate the pressure in passage 238 and control the rate of release of the low-and-intermediate servo $B_2$ upon a 2-3 upshift.

The left hand side of valve land 288 of the 2-3 modulator valve is subjected to throttle valve limiting pressure distributed to it from passage 198. A companion valve land 292 is acted upon by valve spring 272 for the valve assembly 120. Valve lands 288 and 292 are disposed in valve chamber 294, which is aligned with valve chamber 260 for the valve assembly 120. Valve spool 290 on which the lands 288 and 296 are formed modulates the throttle valve limiting pressure to produce a modified 2-3 upshift pressure in crossover passage 296. When the force of governor pressure acting on the right hand side of the shift valve assembly 120 overcomes the opposing force of the spring 272 and the modified throttle pressure force in the spring chamber for spring 272, valve spool 258 shifts in a left hand direction. This establishes communication between line pressure passage 134 and passage 298. Passage 298 in turn communicates with passage 300, which communicates in turn with passage 302 through one way check valve 304 shown in FIG. 4B. Passage 302 extends to the release side of the low-and-intermediate servo $B_2$. Passage 302 in addition communicates with passage 304, as seen in FIG. 4D, and passage 304 supplies control pressure to the direct clutch $CL_3$ through the double position check valve 306 shown in FIG. 4C. As the release side of the servo $B_2$ becomes pressurized, the servo is released and fluid is exhausted from the apply side. Simultaneously the direct clutch $CL_3$ is applied as clutches $CL_1$ and $CL_2$ remain applied. Thus the transmission is conditioned for direct drive, third speed ratio operation.

3-4 Shift and Modulator Valve Assembly

The 3-4 upshifts and the 3-4 downshifts are controlled by valve assembly 122. This valve assembly comprises a valve spool 308 which has formed thereon spaced valve lands 310, 312, 314, 316 and 318. Governor pressure is distributed to the right hand side of the valve land 318 through governor pressure passage 320 which communicates with governor pressure passage 232. Valve spool 308 is positioned in a valve chamber 322 which has internal valve lands that register with the lands 310, 312, 314, 316 and 318. Aligned with the chamber 322 is a modulator valve chamber 324 which receives valve spool 326. Throttle valve limiting pressure acts on the left hand side of valve land 328 for the valve spool 326. A second valve land 330 on the spool 326 and third land 332 form an area that is subjected to the pressure in passage 352, which is pressurized when the valve system is conditioned for full range operation in first, second or third speed ratio. The space between lands 328 and 326 is exhausted. Valve spool 326 modulates the pressure in the throttle valve limiting pressure passage 216 and the modified shift delay signal then is distributed to the left hand side of the valve spool 308 through crossover passage 334.

When the valve assembly 122 is in the upshift position, spool 308 is in a right hand direction thereby establishing communication between passage 252 and passage 132 as explained previously. When the force of the governor pressure in passage 320 is sufficient to overcome the opposing force of the spring 336 acting on the left hand side of the spool 308 and the opposing hydraulic forces on the modulator valve spool 326. The spool 308 will shift in a left hand direction which corresponds to the upshift condition. This exhausts passage 252 through passage 338 in the valve assembly 122. The forward clutch $CL_1$ thus becomes exhausted through the exhaust passage that now is defined by passage 170, passage 254, passage 252 and exhaust port 338. Passage 298, which is fed from passage 134 through the 2-3 shift valve, now communicates with passage 340 through the upshifted 3-4 shift valve assembly 122 as land 312 uncovers a port in the assembly 122 that communicates with passage 298.

Passage 340 communicates with overdrive servo feed passage 342, shown in FIG. 4B. The flow path to the overdrive servo includes orifice 344, thus delaying the rate of application of the overdrive brake. A one way check valve 346 in parallel with the orifice 344 permits rapid flow of fluid from the overdrive servo as a 4-3 downshift occurs. The exhaust flow path at that time includes the passage 340 and the exhaust port 348 in the valve assembly 122.

2-4 Inhibiter Valve

Inhibiter valve assembly 350 shown in FIG. 4D controls upshifts from the second drive range directly to the overdrive range. It is effective to prevent or to inhibit such an upshift until the direct clutch pressure in passage 304 is sufficiently high to accommodate the torque requirements of the driveline. In this way the friction elements of the direct clutch $CL_3$ are protected from excessive energy dissipation and wear if the driving conditions are such that a 2-4 upshift is appropriate.

During operation in the first and second driving ratio, the direct clutch $CL_3$ is released. Thus the pressure in passage 304 is exhausted. Line pressure from passage 132 is applied to the right hand side of valve land 352 of the inhibiter valve assembly 350. Valve assembly 350 comprises valve spool 354 on which the land 352 is formed in spaced relationship with respect to companion land 356. Passage 358 extends from the valve chamber 360 for the valve assembly 350 at a location intermediate the lands 356 and 352 and extends to the valve chamber for the 3-4 modulator valve assembly and to the valve chamber 322 for the 3-4 shift valve spool 308.

In those circumstances when the upshift from the second ratio to the fourth ratio is called upon, the throttle valve limiting pressure is relatively low and the valve spool 326 is shifted in a left hand direction. Communication then is established between passage 358 and the spring chamber for spring 336 between the valve spools 326 and 308. The pressure in passage 358 then forces the 3-4 shift valve spool 308 to maintain the third speed ratio position. When the clutch pressure in clutch $CL_3$ increases sufficiently, the pressure in passage 304, which is distributed to the left hand side of the valve land 356 through passage 361, will force the valve spool 354 in a right hand direction. This will allow passage 358 to be exhausted through the 3-4 inhibiter valve and through passage 362 and the 4-3 scheduling valve assembly shown at 130. Passage 364, which communicates with the valve assembly 130, serves as an exhaust passage under these conditions since it communicates with the open end of the manual valve assembly 116. Thus an upshift to the fourth ratio can be achieved without experiencing the problems associated with partial engagement of the clutch $CL_3$ due to insufficient clutch pressure.

3-2 Control Valve

Valve assembly 368 is a 3-2 control valve that controls the timing of the application of the intermediate servo $B_3$ and the release of the direct clutch $CL_3$ on a 3-2 downshift. Application of the intermediate servo $B_2$ is achieved by controlling the rate of displacement of fluid from the release side of the servo through passage 302 on a 3-2 downshift. Fluid pressure must be discharged from the direct clutch $CL_3$ and the release side of the intermediate servo $B_2$ through passages 302 and 304, respectively. Both of these passages 302 and 304 communicate with a common exhaust flow path on the downstream side of the juncture point 370 shown in FIG. 4D. To reach the juncture point 370 the fluid discharged from the release side of the servo $B_2$ must pass through flow restricting orifice 372. The balance of that fluid passes through the 3-2 control valve.

The 3-2 control valve comprises a valve spool 374 having three spaced lands 376, 378 and 380. A differential area is defined by the lands 378 and 380 and that area is in communication with governor pressure passage 332 through governor passage 382. The force of the governor pressure on that differential area opposes the force of valve spring 384 which normally urges the valve spool 374 in a left hand direction. An increase in governor pressure will progressively restrict communication between passage 302 and exhaust flow passage 386. The 3-2 control valve thus acts as a regulator valve as fluid on the downstream side of the 3-2 control valve is distributed to the left hand side of the valve spool 374 through feedback passage 388. At high vehicle speeds the governor pressure is sufficient to provide a relatively high restriction in the servo release flow path.

The exhaust flow path for the direct drive clutch and the release side of the servo $B_2$ on a 3-2 downshift includes passage 302 and orifice 390, one way check valve 392, passage 298, the 2-3 shift valve spool 258, passage 394 which communicates with the 2-3 shift valve chamber 260 and backout valve assembly 396. The backout valve assembly has a valve spool 398 that assumes a right hand position.

TV Limit and Neutral-To-Direct Valve Assembly

FIG. 4D shows at 402 a TV limit and neutral-to-direct engagement valve assembly. It includes a TV limit valve spool 404 and a neutral-to-direct engagement valve spool 406. Valve spool 406 comprises lands 408 and 410 that define a differential area that is in communication with throttle valve pressure passage 412 which communicates with the previously described throttle pressure passage 140 described with reference to FIG. 4A. Valve spring 414 urges the valve spool 406 in a left hand direction. At low throttle valve pressures spool 406 is stroked in a left hand direction thereby interrupting communication between passage 132, which is the main line pressure supply passage, and branch passage 416 extending to passage 234. Passage 234 communicates with passage 238 which supplies the apply side of the low speed servo $B_2$ through the 2-3 servo regulator valve. All of the fluid distributed from passage 132 to the apply side of the brake servo $B_2$ then must pass through flow restricting orifice 418, which bypasses the passage 416. When the vehicle is operated under torque, the TV pressure is sufficiently high to shift the valve spool 406 in a right hand direction thereby establishing communication between passages 132 and 234.

Located in axial alignment with the valve spool 406 is valve spool 404, which has three spaced lands 420, 422 and 424. Valve spring 426 urges the spool 404 in a left hand direction. When the valve spool 406 assumes the left hand direction, free communication is established between throttle pressure passage 412 and throttle valve limiting pressure passage 430, which communicates with throttle limiting pressure passage 142 described previously. Feedback passage 432 distributed the pressure in passage 430 to the left hand side of the land 420. An exhaust port is located at 434. The TV limit valve assembly, therefore, is capable of reducing the magnitude of the pressure developed by the throttle valve in passage 412 and provides a calibrated throttle valve limiting pressure in passage 430, which is distributed to the left hand end of each of the three shift valves described previously with reference to FIGS. 4C and 4D. This establishes the shift point for the various ratio changes. Shift points thus can be calibrated independently of the value of the throttle valve pressure in passage 412 that is required to maintain the proper regulated line pressure for the control circuitry.

Throttle Valve Assembly

The throttle plunger and control valve assembly 136 comprises a valve sleeve 436 having internal lands that register with external lands on throttle valve spool 438. The lands for the valve spool 438 are shown at 440, 442 and 444. Valve spool 438 is urged in a left hand direction as seen in FIG. 4A by valve spring 446.

A throttle valve plunger 448 is arranged in axial alignment with the spool 438 and is separated from the spool 438 by valve spring 444. For an understanding of the mode of operation of a valve of this kind, reference may be made to U.S. Pat. No. 4,369,677, issued to Charles W. Lewis.

Plunger 448 has spaced lands 450 and 452 which define a differential area that communicates with throttle valve limiting passage 442 which establishes a force that augments the driver operated linkage force acting in a left hand direction on the plunger 448. The driver operated linkage is connected to the engine carburetor throttle for the internal combustion engine so that upon movement of the engine caburetor throttle to an open position the spring 446 becomes compressed.

Regulated line pressure from passage 202 is distributed to the valve assembly 136 through port 454. A throttle valve feedback passage 456 communicates with the differential area defined by lands 440 and 442. Thus the pressure in passage 140 is a pressure that is proportional to movement of the plunger 448 and hence it is proportional to the degree of opening of the engine carburetor throttle. In this respect it is generally proportional to engine torque.

Main Regulator and Boost Valve Assembly

The valve assembly 114 shown in FIG. 4A regulates the pressure made available to the circuit by the pump 38. It includes a regulating valve spool 458 that has four lands 460, 462, 464 and 466. The output pressure passage 102 for the pump 38 communicates with the valve chamber that occupied by the valve spool 458. Feedback pressure passage 468 extends to the right hand side of the land 466.

Concentric valve springs 470 act on the left hand end of valve spool 458. The innermost spring of the concentric springs acts on a boost valve element 472 received in a sleeve 474. The left hand end of the spool 472 receives a modified throttle valve pressure from passage 476 which communicates with passage 478 through one way check valve 480. Passage 478 thus has a pressure that is generally related in magnitude to the engine torque, and upon an increase in torque the effective force that augments the force of springs of 470 increases to cause an increase in regulated line pressure maintained by the valve assembly 114. Boost valve element 472 includes also a differential area defined by spaced lands 480 and 482 which communicates with reverse line pressure passage 484. Passage 484 communicates with the reverse clutch. Thus whenever the reverse clutch is applied pressure is distributed to that differential area to augment the force acting on valve spool 458 in a right hand direction to further increase the magnitude of the circuit pressure level during reverse drive.

A pump control pressure passage 486 communicates with the valve chamber for spool 458 adjacent land 460.

That pressure is distributed to control chamber 488 in the variable displacement pump 338 thereby causing pivoting movement of the valve stator ring 106 about the pivot 108 to decrease the displacement of the pump and thereby maintain an upper limit on the magnitude of the regulated line pressure. Lubrication pressure passage 490 communicates with the valve chamber for the valve spool 458 intermediate lands 462 and 464 whereby the magnitude of the lube pressure in passage 490 is maintained at a desired level.

The differential area defined by lands 464 and 466, as previously mentioned, is in communication with passage 240, as explained previously, through port 242. But that port 242 is exhausted during low speed ratio operation as the 1-2 shift valve spool 178 moves to the downshift position. Thus a higher regulated line pressure is maintained during low speed ratio operation that during operation in the second, third or fourth speed ratio. The clutch and brake servos are thus effective to accommodate the higher torque capacity required for low speed ratio operation.

TV Line Modulator and 4-3 Scheduling Valve

The valve assembly 130 includes a 4-3 scheduling valve spool 492 as seen in FIG. 4B. Spool 492 is located in a valve chamber 494 which is common to the valve chamber 496 for the TV line modulator valve spool 498.

Valve spool 492 has spaced lands 500, 502 and 504. Passage 364 serves as an exhaust passage since it is exhausted through the end of the manual valve assembly 116 in all positions except the D and L positions. Valve chamber 492 receives control pressure through the main control pressure passage 132 adjacent land 500. Passage 506 is the output pressure passage for the 4-3 scheduling valve. It receives from the 4-3 scheduling valve a reduced regulated pressure, the magnitude of which is the function of the rate of spring 508 acting on the valve spool 492 in a right hand direction as seen in FIG. 4B. Passage 506 distributes that regulated reduced pressure when the valve system is conditioned for first, second or third ratio operation to passage 362 and through the 2-4 inhibitor valve assembly 350, to passage 358 and the 3-4 modulator valve chamber 324. It thus develops a 4-3 shift point controlling pressure on the left hand side of the land 310 of the 3-4 shift valve spool.

When the transmission is in condition for third speed ratio operation, passage 508 is pressurized because it communicates with passage 252 that is pressurized when the 3-4 shift valve spool 308 is in the downshift position. This introduces a pressure force on the differential area of land 502 and 504 thereby modifying the effective regulated reduced pressure in passage 506 and establishing the proper 4-3 downshift point.

The throttle valve line pressure modulator valve spool 498 comprises lands 510, 512 and 514. Valve spool 498 is urged in a left hand direction by valve spring 516.

Figure 4E:
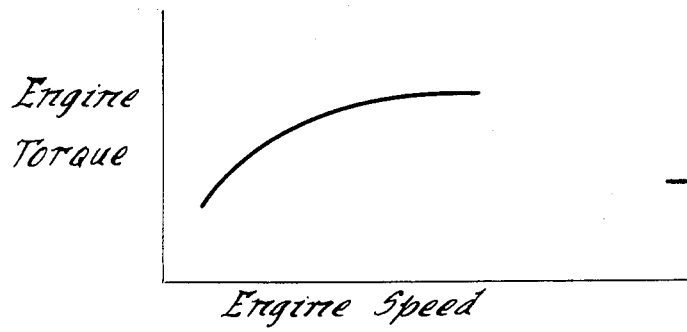
FIGS. 4E, 4F, 4G and 4H are charts showing the relationship between the engine speed-torque curve and the effective lutch and brake servo pressure for any engine throttle opening.

The TV line modulator valve is a regulator valve the exhaust port for which is shown at 518. The supply passage for the TV line modulator valve is the throttle valve limiting pressure passage 520, which communicates with the previously described passage 430. Valve lands 512 and 514 define a differential area that is acted upon by the throttle valve limiting pressure in passage 520. That pressure augments the force of the spring 516. The output pressure passage for the TV line modulator valve is passage 522 and a feedback branch passage 524 extends from the line 522 to the left hand end of the modulator valve spool 496. The throttle valve limiting pressure passage 522 extends to the passage 476 as explained previously which in turn communicates with passage 478 and the left hand end of the main regulator boost valve element 472. The TV line modulator valve in conjunction with the TV limit valve 434 is effective to distribute a regulator valve modifier pressure that enables the main regulator valve to develop a variable control pressure in the circuit that generally matches the characteristic shape of the engine speed torque curve for the engine with which the transmission is calibrated. The internal combustion engine characteristically has a curve similar to that shown, for example, in FIG. 4E.

Figure 4F:
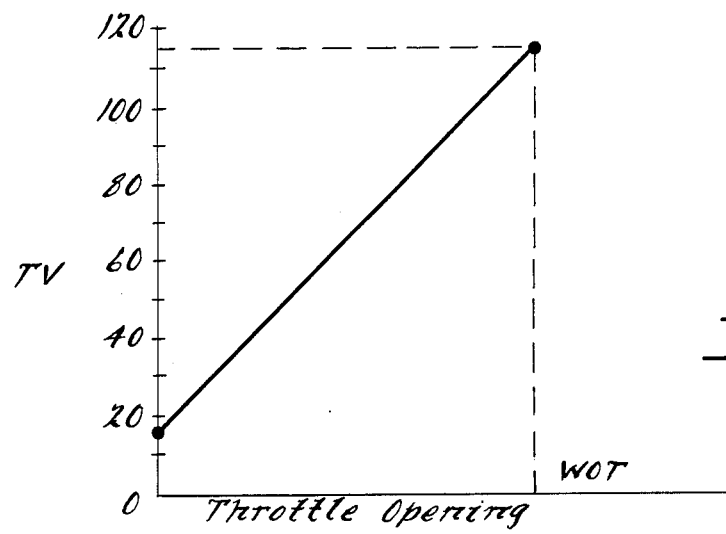

The relationship between engine carburetor throttle opening and the magnitude of the throttle valve pressure in passage 140 and in passage 412 is generally linear as indicated in FIG. 4F. At zero engine throttle the throttle valve pressure in a typical installation is about 15 psi. At wide open throttle a typical value for throttle valve pressure is 115 psi.

Figure 4G:
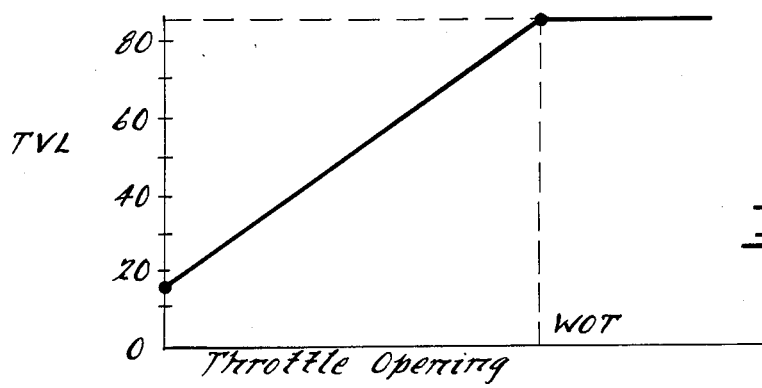

Throttle valve pressure is distributed to the TV limit valve through passage 412. The TV limit valve is in a left hand position because of the spring force of spring 428 when the throttle valve pressure is in a range of values between 15 psi and about 85 psi. Thus the output of the TV limit valve assembly 402 which is distributed to passage 430, is linear just as the throttle valve characteristic of FIG. 4F is linear. The relationship between throttle valve limiting pressure and throttle opening for the engine is indicated in FIG. 4G.

As indicated in FIG. 4D, throttle valve limiting pressure is applied to the throttle valve line modulator valve assembly 300 and it acts on the differential area of lands 512 and 514. This causes the valve spool 498 to modulate the pressure in passage 142 to produce a modified throttle valve limiting pressure in passage 476 which is distributed, as explained previously, to the left hand side of the boost valve element 572 of the main regulator valve 114.

Figure 4H:
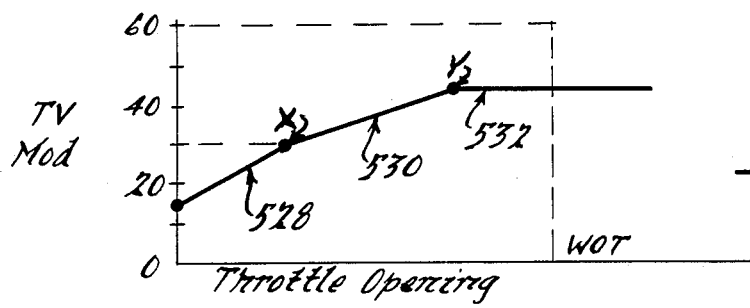

When engine throttle opening is plotted against throttle valve limiting modulated pressure, a relationship such as that shown in FIG. 4H is developed. Since initially the throttle valve limiting pressure equals throttle valve pressure, the portion of the curve shown at 528 is a straight line that generally is parallel to the throttle valve pressure line of FIG. 5F. When a throttle valve modulated pressure of about 30 psi is achieved, spring 508 begins to be compressed so that the throttle valve limiting pressure no longer equals the pressure in passage 522. The effective characteristic curve changes slope at this point as indicated in FIG. 4H. The change in slope is designated by point "X" in FIG. 4H. A further increase in the throttle valve modulated pressure continues along straight line portion 530 of the curve of FIG. 4H until point "Y" is reached at which time the throttle valve limit valve spool 404 begins to regulate throttle valve pressure as the spring 428 is compressed. This produces the brake point shown at point "Y" in FIG. 4H and thereafter the relationship between throttle valve modulated pressure and engine throttle opening is generally horizontal as shown by curve portion 532 until the wide open throttle position is reached. It may be seen that the curve of FIG. 4H generally approximates the engine torque curve of FIG. 4E. Thus the main regulator valve is capable of developing a circuit pressure that generally is related to the magnitude of the engine torque at any given speed.

Bypass Clutch Control and Converter Regulator

The converter lockup clutch is controlled by a bypass clutch control shown in FIG. 4A. It includes a multiple land valve spool 530. Four valve lands are formed on the valve spool 530 as shown at 532, 534, 536 and 538. Valve spool 530 is slidably positioned in valve chamber 540 which has internal valve lands that register with the lands 532, 530, 534, 536 and 538.

The bypass clutch control is fed with regulated pressure from the main regulator and boost valve assembly 114 through passage 542, which communicates with the main regulator valve at a location intermediate lands 462 and 464. An exhaust port 544 registers with the main regulator valve chamber, and a feedback branch passage 546 for the main regulator valve spool supplies the feedback pressure that opposes the force of the spring 470. Thus a calibrated pressure is obtained in passage 486 for pump displacement control purposes and a converter feed pressure in passage 542 is a separately regulated pressure. Passage 542 communicates with passage 548 across orifice 550.

The feed passage 552 for the converter flow inlet communicates with passage 548 across orifice 554. The converter flow return passage from the turbine side of the converter is shown at 556. Flow control orifice 558 connects passage 556 with the front lubrication circuit 560. A lube pressure check valve 562 is located in the passage 560. The outlet side of the valve 562 is connected to the transmission cooler 564 which supplies the front lube circuit 566.

When the converter bypass clutch is disengaged, the valve spool 530 of the bypass clutch control is in a right hand position which establishes a connection between passage 556 and passage 560 as land 538 uncovers the valve port in chamber 540 that is connected to passage 560. This effectively bypasses the orifice 558.

In the clutch release position described above land 534 uncovers the port in valve chamber 540 that communicates with branch passage 568 thereby establishing communication between passage 548 and converter bypass flow passage 570 through the branch passage 568.

The converter bypass clutch 28 includes a clutch diaphragm 570 extending in a radial direction. It cooperates with impeller housing 572 to define a radial outflow passage connecting the passage 570 with the interior of the torus circuit. Thus when the clutch is disengaged both passages 552 and the clutch bypass passage 570 act as converter flow inlet passages while passage 556 serves as a flow return passage.

Control pressure distributed to the left hand end of valve plug 574 from passage 102 establishes a pressure force on a plug which is transmitted to the valve spool 530 to lock it in the unclutched position. If a control signal is distributed to the solenoid pressure line 576, pressure is distributed to the right hand end of land 538 which causes the valve spool 530 to shift in a left hand direction, which corresponds to the locked clutch condition. The valve port which communicates with passage 548 then is uncovered by land 536 and converter pressure fluid then passes from passage 542 through the orifice 550 and through the companion orifice 578 to the passage 580, which extends to the cooler 564 and the front lube circuit 566. Simultaneously, the port communicating with branch passage 568 is brought into communication with passage 582. Bypass pressure passage 570 is brought into communication with exhaust passage 584, which communicates with the exhaust end of the manual valve assembly. The converter feed path then includes passage 548, passage 568, passage 582 and passage 552. Passage 556 continues to function as a flow return passage from the turbine side of the converter. All of the fluid returned to the front lube circuit when the clutch is locked must pass through the flow restricting orifice 558. A back pressure then is developed in the torus circuit which acts on the clutch plate 570 causing the clutch 28 to engage thereby locking the converter turbine with the converter impeller.

The solenoid pressure in passage 576 is controlled by a converter bypass solenoid 586, as seen in FIG. 4B. The solenoid is under the control of a power train electronic control module 588 shown in FIG. 3. The module establishes a pulse width modulation characteristic in response to input signals to develop a desired pressure in passage 476. The input signals for the module 588 may be analog signals representing engine input speed, throttle position for the engine carburetor, engine temperature, vehicle speed. A wheel brake signal is used also. It is active when the wheel brakes are applied so that the module will cause the solenoid to be disabled thereby exhausting the passage 576 and unlocking the converter when the vehicle is braked. This avoids stalling of the engine when the wheel brakes are applied while the transmission is in a cruising, converter lockup drive condition. The output from the module 588 is a signal used by the on/off bypass solenoid 586 to establish a desired pressure level in passage 576. Governor output indicated in FIG. 3 is a self-test diagnostic output signal.

When the signal in passage 576 is above a special value, the bypass control clutch valve element 530 is shifted to a locked condition in a left hand direction. If the signal in passage 576 is lower than a low threshold value dependent on the magnitude of the line pressure, the bypass clutch control valve spool 530 is shifted fully to its right hand clutch unlocked position. For values of pressure in passage 576 between the upper threshold value and the lower threshold value, a variable pressure in the clutch bypass control circuit is developed which in turn results in a varying clutch capacity for the lockup clutch 28. The clutch capacity can be matched with the optimum clutch capacity that is dictated by any given engine speed, throttle position, engine temperature and vehicle speed.

Passage 590 shown in FIG. 4A is a lube passage that is separate from the front lube circuit. It is identified in FIG. 4A as a rear lube circuit. The rear lube circuit is fed through orifice 592, which is in communication with the previously described passage 548. The added lube capacity for the transmission system made available by the two independent lube circuits provides better lubrication and better durability since it is not necessary to rely on a single flow path through the torque converter to establish lubrication at the various transmission lubrication points. One lubrication flow path is from the cooler return circuit and the other is from the converter charge circuit.

The converter bypass solenoid valve is a normally open valve comprising orifice 594 and solenoid actuated armature valve element 596. Solenoid orifice 594 is supplied with pressure from passage 302 through filter 598 and through flow restricting orifice 600. Passage 302 is pressurized whenever the release side of the intermediate servo $B_2$ is pressurized. This condition exists only during third or fourth speed ratio operation. Thus it is possible for the lockup clutch to be engaged only during operation of the drive line in the third or fourth ratio.

The pressure level in the torus circuit of the impeller housing is maintained at a desired level by converter regulator valve 602 which comprises a regulator valve spool 604 with spaced lands 606, 608 and 610. Valve spool 604 is urged in a right hand direction by valve spring 612. Lands 608 and 610 define a differential area that receives pressure from passage 548. The force of that pressure is opposed by spring 612. The exhaust port for valve 602 is shown at 614. The pressure maintained in passages 548 and 552 is a reduced pressure that is dependent on the spring force and the differential area of lands 608 and 610.

Having described a preferred embodiment of my invention, what I claim and desire to secure by U.S. Letters Patent is:

1. In a power transmission mechanism for a driveline for a vehicle powered by an internal combustion engine;
   a hydrokinetic torque converter having a bladed impeller housing driven by said engine, a bladed turbine in said housing, a bladed stator and a turbine shaft connected to said turbine;
   multiple ratio gearing having a torque input member and a torque output member with plural torque flow paths defined by gear elements between the input and output members and having clutch and brake servo means for establishing selectively four forward driving speed ratios and a reverse ratio;
   the highest speed ratio being an overdrive, the second highest speed ratio being a direct one-to-one speed ratio and the third highest speed ratio being an underdrive;
   said clutch and brake servo means including an overdrive brake, a direct drive clutch and an underdrive brake, said underdrive brake including fluid pressure apply and fluid pressure release portions, said underdrive brake being released when both the apply portion and the release portion are pressurized simultaneously and being applied when the release portion is exhausted while the apply portion is pressurized;
   a fluid pressure source and control valve circuitry connecting said clutch and brake means with said pressure source to effect sequential clutch and brake engagement and release;
   said valve circuitry including a first hydraulic pressure passage communicating with said direct drive clutch and with the release portion of said underdrive brake whereby said underdrive brake is released when said direct drive clutch is applied;
   converter lockup clutch means for connecting directly said impeller and said turbine to effect a mechanical torque delivery path between said engine and said turbine shaft, said lockup clutch means comprising a friction clutch member in said impeller housing having a friction surface on one side thereof, said clutch member and said impeller housing defining a converter bypass flow passage therebetween, a converter impeller housing fluid feed passage and a converter turbine fluid flow return passage;
   a bypass clutch control means communicating with a second hydraulic pressure passage and forming a part of said circuitry, said bypass clutch control means comprising a valve sleeve and a valve element therein, said valve sleeve and said valve element having registering valve lands located in and partly defining said converter bypass flow passage, said fluid feed passage and said flow return passage;
   means for urging said valve element in one direction to establish a flow circuit through said converter bypass flow passage thereby effecting disengagement of said lockup clutch means;
   means for urging said valve element in the opposite direction to connect said converter bypass flow passage with a low pressure region thereby effecting engagement of said lockup clutch means; and
   means responsive to operating variables of said driveline to change the forces acting on said bypass clutch control element to effect a modification in the effective bypass clutch torque capacity;
   said operating variable responsive means comprising a solenoid operated valve and a third hydraulic pressure passage extending from said solenoid operated valve to said bypass clutch control means, the latter being sensitive to the pressure in said third passage, and a control module for actuating said solenoid operated valve, said module being adapted to receive engine torque and speed signals;
   said first hydraulic pressure passage communicating with said third hydraulic pressure passage through a control orifice, said solenoid operated valve being on the downstream side of said control orifice.

2. The combination as set forth in claim 1 wherein said solenoid operated valve control module is adapted to effect an electrical pulse width modulated signal and a solenoid valve actuator adapted to receive said pulse width modulated signal.

3. The combination as set forth in claim 1 wherein the means for urging said valve element in said one direction comprises a pressure land on one side thereof and a passage connecting said one land side with said pressure source.

4. The combination as set forth in claim 2 wherein the means for urging said valve element in said one direction comprises a pressure land on one side thereof and a passage connecting said one land side with said pressure source.

5. In a power transmission mechanism for a driveline for a vehicle powered by an internal combustion engine;
   a hydrokinetic torque converter having a bladed impeller housing driven by said engine, a bladed turbine in said housing, a bladed stator and a turbine shaft connected to said turbine;
   multiple ratio gearing having a torque input member and a torque output member with plural torque flow paths defined by gear elements between the input and output members and having clutch and brake servo means for establishing selectively four forward driving speed ratios and a reverse ratio;
   the highest speed ratio being an overdrive, the second highest speed ratio being a direct one-to-one speed ratio and the third highest speed ratio being an underdrive;
   said clutch and brake servo means including an overdrive brake, a direct drive clutch and an underdrive brake, said underdrive brake including fluid pressure apply and fluid pressure release portions, said underdrive brake being released when both the apply portion and the release portion are pressurized simultaneously and being applied when the release portion is exhausted while the apply portion is pressurized;

a fluid pressure source and control valve circuitry connecting said clutch and brake means with said pressure source to effect sequential clutch and brake engagement and release;

said valve circuitry including a first hydraulic pressure passage communicating with said direct drive clutch and with the release portion of said underdrive brake whereby said underdrive brake is released when said direct drive clutch is applied;

converter lockup clutch means for connecting directly said impeller and said turbine to effect a mechanical torque delivery path between said engine and said turbine shaft, said lockup clutch means comprising a friction clutch member in said impeller housing having a friction surface on one side thereof, said clutch member and said impeller housing defining a converter bypass flow passage therebetween, a converter impeller housing fluid feed passage and a converter turbine fluid flow return passage;

a bypass clutch control means communicating with a second hydraulic pressure passage and forming a part of said circuitry, said bypass clutch control means comprising a valve sleeve and a valve element therein, said valve sleeve and said valve element having registering valve lands located in and partly defining said converter bypass flow passage, said fluid feed passage and said flow return passage;

means for urging said valve element in one direction to establish a flow circuit through said converter bypass flow passage thereby effecting disengagement of said lockup clutch means;

means for urging said valve element in the opposite direction to connect said converter bypass flow passage with a low pressure region thereby effecting engagement of said lockup clutch means; and means responsive to operating variables of said driveline to change the forces acting on said bypass clutch control element to effect movement thereof in said one direction and said opposite direction;

said operating variable responsive means comprising a solenoid operated valve and a third hydraulic pressure passage extending from said solenoid operated valve to said bypass clutch control means, the latter being sensitive to the pressure in said third passage, and a control module for actuating said solenoid operated valve, said module being adapted to receive engine torque and speed signals;

said first hydraulic pressure passage communicating with said third hydraulic pressure passage through a control orifice, said solenoid operated valve being on the downstream side of said control orifice.

6. The combination as set forth in claim 5, wherein said solenoid operated valve control module is adapted to effect an electrical pulse width modulated signal and a solenoid valve actuator adapted to receive said pulse width modulated signal.

7. The combination as set forth in claim 5 wherein the means for urging said valve element in said one direction comprises a pressure land on one side thereof and a passage connecting said one land side with said pressure source.

8. The combination as set forth in claim 6 wherein the means for urging said valve element in said one direction comprises a pressure land on one side thereof and a passage connecting said one land side with said pressure source.

9. In a power transmission mechanism for a driveline for a vehicle powered by an internal combustion engine;

a hydrokinetic torque converter having a bladed impeller housing driven by said engine, a bladed turbine in said housing, a bladed stator and a turbine shaft connected to said turbine;

multiple ratio gearing having a torque input member and a torque output member with plural torque flow paths defined by gear elements between the input and output members and having clutch and brake servo means for establishing selectively four forward driving speed ratios and a reverse ratio;

the highest speed ratio being an overdrive, the second highest speed ratio being a direct one-to-one speed ratio and the third highest speed ratio being an underdrive;

said clutch and brake servo means including an overdrive brake, a direct drive clutch and an underdrive brake, said underdrive brake including fluid pressure apply and fluid pressure release portions, said underdrive brake being released when both the apply portion and the release portion are pressurized simultaneously and being applied when the release portion is exhausted while the apply portion is pressurized;

a fluid pressure source and control valve circuitry connecting said clutch and brake means with said pressure source to effect sequential clutch and brake engagement and release;

said valve circuitry including a first hydraulic pressure passage communicating with said direct drive clutch and with the release portion of said underdrive brake whereby said underdrive brake is released when said direct drive clutch is applied;

converter lockup clutch means for connecting directly said impeller and said turbine to effect a mechanical torque delivery path between said engine and said turbine shaft, said lockup clutch means comprising a friction clutch member in said impeller housing having a friction surface on one side thereof, said clutch member and said impeller housing defining a converter bypass flow passage therebetween, a converter impeller housing fluid feed passage and a converter turbine fluid flow return passage;

a bypass clutch control means communicating with a second hydraulic pressure passage and forming a part of said circuitry, said bypass clutch control means comprising a valve sleeve and a valve element therein, said valve sleeve and said valve element having registering valve lands located in and partly defining said converter bypass flow passage, said fluid feed passage and said flow return passage;

means for urging said valve element in one direction to establish a flow circuit through said converter bypass flow passage thereby effecting disengagement of said lockup clutch means;

means for urging said valve element in the opposite direction to connect said converter bypass flow passage with a low pressure region thereby effecting engagement of said lockup clutch means; and means responsive to operating variable of said driveline to change the forces acting on said bypass clutch control element to effect movement thereof in said one direction and said opposite direction;

said operating variable responsive means comprising a solenoid operated valve and a third hydraulic pressure passage extending from said solenoid operated valve to said bypass clutch control means, the latter being sensitive to the pressure in said third passage, and a control module for actuating said solenoid operated valve, said module being adapted to receive engine torque and speed signals; said servo means communicating with said third hydraulic pressure passage through a control orifice, said solenoid operated valve being on the downstream side of said control orifice.

* * * * *